United States Patent [19]
Miller
[11] 4,052,723
[45] Oct. 4, 1977

[54] RANDOMLY AGGLOMERATED SUBARRAYS FOR PHASED ARRAY RADARS

[75] Inventor: Coleman J. Miller, Twin Harbors, Md.

[73] Assignee: Westinghouse Electric Corporation, Pittsburgh, Pa.

[21] Appl. No.: 680,251

[22] Filed: Apr. 26, 1976

[51] Int. Cl.[2] .............................................. H04B 7/00
[52] U.S. Cl. ....................... 343/100 LE; 343/100 SA; 343/854
[58] Field of Search .................. 343/100 LE, 100 SA, 343/854, 770, 771

[56] References Cited

U.S. PATENT DOCUMENTS

| | | | |
|---|---|---|---|
| 3,056,961 | 10/1962 | Mitchell | 343/100 SA |
| 3,090,956 | 5/1963 | Woodward, Jr. et al. | 343/100 SA |
| 3,611,401 | 10/1971 | Connolly | 343/100 SA |
| 3,711,858 | 1/1973 | Reeder, Jr. | 343/100 LE |
| 3,886,547 | 5/1965 | Bottenberg | 343/100 SA |

*Primary Examiner*—Maynard R. Wilbur
*Assistant Examiner*—T. M. Blum
*Attorney, Agent, or Firm*—H. W. Patterson

[57] ABSTRACT

A phased array radar for providing a beam cluster whose average direction is determined by phase shifters associated with each antenna radiating element, and whose illumination function is determined by the phase and amplitude provided to subarrays of randomly agglomerated radiating elements which provide an aperiodic illumination error function that substantially reduces the grating lobes of the antenna pattern.

17 Claims, 5 Drawing Figures

RANDOMLY AGGLOMERATED SUBARRAYS FOR PHASED ARRAY RADARS

CROSS-REFERENCE TO RELATED APPLICATION

The disclosed apparatus may employ the antenna elements described in the copending application "Improved Dipole Phased Array", Ser. No. 656,913, filed Feb. 10, 1976, by Coleman J. Miller.

BACKGROUND OF THE INVENTION

1. Field of the Invention

The present invention relates to phased array radars and, more particularly, to subarrays of the antennas of such radars.

2. Description of the Prior Art

In the prior art, phased array radars have been employed to provide a beam cluster antenna pattern which is centered on a known average direction, and also to provide a narrow beam antenna pattern suitable for scanning a limited range. In the beam cluster usage, the average direction of the beam cluster has been determined by phase shifters associated with each of the radiating elements in the antenna while the cluster pattern has been determined by a second phase shift mechanism. Typically, this second phase shift mechanism consists of transmission lines of varying lengths, associated with antenna subarrays comprised of a number of the antenna radiating elements. In the narrow beam usage, the direction of the single beam is also determined by phase shifters which, in this case, are associated directly with antenna subarrays comprised of a plurality of antenna radiating elements such that the phase shifters are controlled to regulate the scanning of the single beam.

Both of these prior art phased array radars have employed antenna subarrays comprised of agglomerated radiating elements which define geometrically regular patterns on the conducting surface of the radar antenna as a means to avoid the cost and unreliability associated with the apparatus necessary to individually control the phase and amplitude of each of the radiating elements. These geometrically regular subarrays provide an illumination phase and amplitude which precisely matches the phase and amplitude necessary to produce the illumination function required for the desired antenna pattern only at a single point on the subarray. The difference between the actual illumination function and the ideal illumination function needed to produce the desired pattern is known as the illumination error function; and the difference between the actual antenna pattern and the desired antenna pattern is given by the Fourier transform of the illumination error function.

For most prior art antenna subarrays, the resulting illumination error function changes sign at regular intervals, giving a periodicity in the error function which produces energy concentrations in the antenna pattern at specific angles from the direction normal to the conducting surface. Such energy concentrations are commonly referred to as sidelobes so that the antenna pattern, as modified by the illumination error is said to exhibit sidelobes at specific angles. To those skilled in the art, sidelobes produced by such periodic disturbances are also called grating lobes. Such grating lobes are undesirable in that they degrade the quality of the antenna pattern.

Prior art phased array radars which have provided an antenna pattern having low sidelobes have generally not employed the use of subarrays and incurred the consequent higher cost and lower reliability of phased array radars which control the excitation of the radiating elements individually.

Prior art phased array radars which employed the use of antenna subarrays have generally used geometrically regular subarrays which have a periodic illumination error function that permits large grating lobes to arise at specific angles in the antenna pattern. For example, since the desired amplitude distribution usually remains constant as the beam is steered, amplitude errors have been compensated by distributing the energy non-uniformly among the antenna elements in each subarray. However, because illumination phase errors are usually much larger than illumination amplitude errors the improvement in illumination function afforded by this embodiment has not been heretofore economically justifiable when the phase errors are otherwise uncompensated for. For radars whose pattern quality is to be measured by the peak value of its grating lobes, these prior art antennas employing the use of subarrays did not provide acceptable performance for many applications.

Other prior art phased array radars employing antenna subarrays have limited the magnitude of the antenna grating lobes through the selection of the location of the antenna elements on the face of the antenna. These antennas, however, have resulted in relatively complex arrangements of antenna elements in comparison to the regular grid arrangement, and even more complex computations as to the appropriate phase shift to be applied to an antenna element where the antenna is to produce a beam cluster.

Accordingly, it is the object of the present invention to reduce the peak values of the grating lobes of phased array antennas employing subarrays, thereby improving antenna quality, by providing an aperiodic illumination error function which distributes the signal energy in a random fashion to significantly reduce the peak values of the antenna grating lobes while providing a reliable, relatively uncomplicated, inexpensive antenna.

SUMMARY OF THE INVENTION

The presently disclosed invention is an improvement in phased array radars having antennas comprised of a multiple of radiating elements which cooperate to provide an antenna beam whose direction and shape is controlled by regulating the phase and amplitude of the excitation of the radiating elements in relation to their location within the phased array antenna. Radiating elements with substantially identical amplitude excitations are randomly agglomerated into subarrays which define geometrically irregular patterns on the conducting surface of the antenna to provide an irregularly stepped illumination function. The subarrays are randomly disposed within sections of the conducting surface of the phased array antenna such that their random disposition cooperates with their geometric irregularity to provide an aperiodic illumination error function for the antenna which substantially reduces the grating lobes of the antenna pattern.

DESCRIPTION OF THE PREFERRED EMBODIMENT

Figure 1:
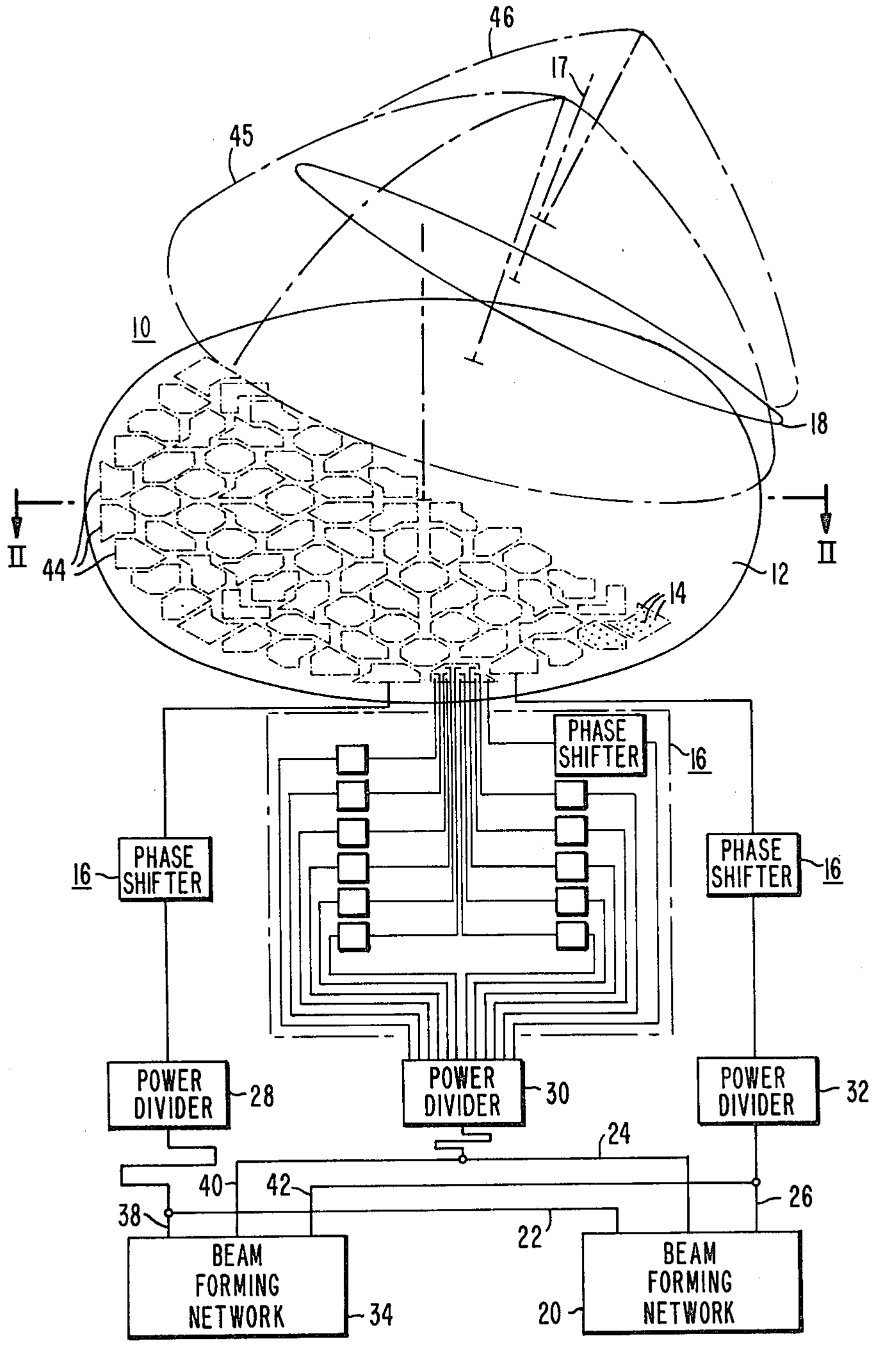
FIG. 1 is an illustration of a phased array radar which utilizes the present improvement to provide a beam cluster antenna pattern having low grating lobes in comparison with phased array radars of the prior art.

FIG. 1 shows a phased array radar which employs subarrays of radiating elements to provide a beam cluster antenna pattern centered about an average direction. The antenna pattern is defined to be the spatial distribution of energy found at points removed from the immediate vicinity of the radar antenna. In the illustration of the preferred embodiment, a phased array antenna 10 is comprised of a conducting surface 12 provided with a multiple of radiating elements 14 which, typically, number in the thousands. For purposes of illustration, the phased array antenna 10 of FIG. 1 is provided with a much smaller number of radiating elements, each of which are identified by reference character 14. One type of radiating element which may be used in the phased array antenna 10 is described in the copending patent application "Improved Dipole Phased Array", Ser. No. 656,913, filed Feb. 10, 1976, by Coleman J. Miller. Each of the radiating elements 14 is associated with a phase shifter 16 so that, for the illustration of FIG. 1, the radiating elements 14 would be provided with an equal number of phase shifters 16. In FIG. 1, only twelve phase shifters 16 which are individually associated with twelve radiating elements 14 have been specifically shown. As well known to those skilled in the pertinent art, the phase shifters 16 associated with the radiating elements 14 control the phase of the excitation signal to each radiating element to determine the average direction of the propagated antenna pattern. In FIG. 1, this average direction is indicated by the vector 17 which is normal to the plane 18.

As well known in the art, a beam forming network 20, comprised of resistive and reactive elements, is responsive to the radar transmitter (not shown) to determine the amplitude and phase of the excitation signal to be provided through feed lines 22, 24 and 26 to the radiating elements 14 and thereby determines the antenna pattern of a beam in the beam cluster. In FIG. 1, lines 22, 24, 26, each supply a plurality of agglomerated radiating elements 14 and their associated phase shifters 16 through power dividers 28, 30 and 32. As used herein "agglomerated radiating elements" are defined to be any group of radiating elements which are adjacently located on the conducting surface 12 and which are responsive to the excitation provided by a particular feed line. This association of the feed lines 22, 24, 26 with an agglomeration of radiating elements 14 is the result of a compromise between performance and cost: the more feed lines that are provided the more accurately the actual antenna pattern will approximate the desired pattern but, also, the more complicated and expensive the antenna will be to build. Those skilled in the pertinent art have referred to these agglomerations of radiating elements 14 which are associated through a power divider with a particular feed line from each beam forming network as subarrays.

With the average direction of the antenna pattern provided by the control of the radiating elements 14 by their associated phase shifters 16, it is also well known to those skilled in the pertinent art that a beam cluster antenna pattern can be provided around this average direction by providing additional phase shifts in the excitation signal to the individual elements 14 which are independent of the phase shifts introduced by the phase shifters 16. Since, for most applications, the antenna pattern of the beam cluster is to remain constant during the operation of the phased array radar system, the second, independent phase shift is typically provided by varying the length of the transmission line between the beam forming network 20 and the phase shifters 16. In the example of FIG. 1, this is illustrated by lines 22, 24 and 26. A similar feed line is provided from an additional beam forming network to the radiating elements for each beam that is to be produced in the cluster. In the example of FIG. 1, a beam forming network 34 supplies lines 38, 40, and 42 to provide two feed lines for each radiating element 14 so that each radiating element 14 simultaneously provides two beams which comprise the beam cluster antenna pattern which is designated in FIG. 1 by dashed beam patterns 45 and 46.

In the prior art, subarrays have been comprised of radiating elements 14 which define regular geometrical patterns on the conducting surface 12. As used herein, "geometrically regular subarrays" are defined to be subarrays in which the radiating elements that are agglomerated in a particular subarray are selected according to a predetermined spatial relationship to other radiating elements of the antenna, or according to a location on the conducting surface of the antenna, so that the group of radiating elements 14 of the subarray define a predictable, symmetrical pattern on the conducting surface. Since the desired antenna patterns are continuous and the excitation signals provided by the feed lines 22, 24, 26, 38, 40 and 42 are each supplied to a plurality of discrete radiating elements 14, there are, necessarily, deviations between the desired antenna pattern and the antenna pattern provided by the radiating elements 14 of the phased array antenna 10. The distribution of electromagnetic energy across an antenna aperture is known as the illumination function. Since the subarrays of the prior art phased array antennas are comprised of elements which define regular symmetrical geometrical patterns, the error between the actual phase and amplitude of the illumination function produced and the desired illumination function is periodic so that the Fourier transform of the illumination error function includes harmonics whose energy tends to concentrate at secific angles causing undesirable peak values in certain sidelobes of the antenna pattern. It is the improvement of the present invention to randomize the illumination error function so that the error function is aperiodic and the energy is distributed more evenly such that large sidelobes are not produced by providing subarrays 44 of the radiating elements 14 which define randomly disposed, geometrically irregular patterns on the surface of conducting plane 12. As used herein "geometrically irregular subarrays" are defined to be subarrays in which the radiating elements 14 that are agglomerated to comprise a particular subarray are randomly selected so that the group of radiating elements 14 comprising the subarray forms an asymmetrical pattern on the conducting surface 12 which is not susceptible to any particular generic definition of a mathematical or geometrical nature. As also used herein, "randomly disposed subarrays" are defined to be subarrays whose location and disposition on the conducting surface 12 is randomly selected so that the location and disposition of the subarray 44 on the conducting surface 12 is also not susceptible to any particular generic definition of a mathematical or geometrical nature. Therefore, the present invention randomizes the illumination error function to avoid large sidelobes in the antenna pattern by providing radiating elements 14 which are randomly selected to compose subarrays 44 such that the asymmetry, location and disposition of the pattern formed by the radiating elements 14 on the conducting surface 12 is not susceptible to any particular generic definition of a mathematical or geometrical nature. From the foregoing explanation, it will be appreciated that each power divider and its associated feed lines and beam forming networks provides a means for exciting groups of radiating elements 14 which define geometrically irregular subarrays 44 on the conducting surface 12 for providing an aperiodic illumination function of the antenna 10 to limit the amplitude of grating lobes in the antenna pattern. Furthermore, it can be seen that the combination of the power dividers, their associated feed lines and beam forming networks afford a means for providing different amplitude excitations to selected radiating elements 14 of the antenna 10, and for providing substantially the same amplitude excitation to groups of the radiating elements 14 which define geometrically irregular subarrays 44 on the conducting surface 12 to establish an aperiodic illumination function for the antenna 10 to limit the amplitude of grating lobes in the antenna pattern. The geometrically irregular subarrays 44 are further described in relation to FIG. 2.

Figure 2:
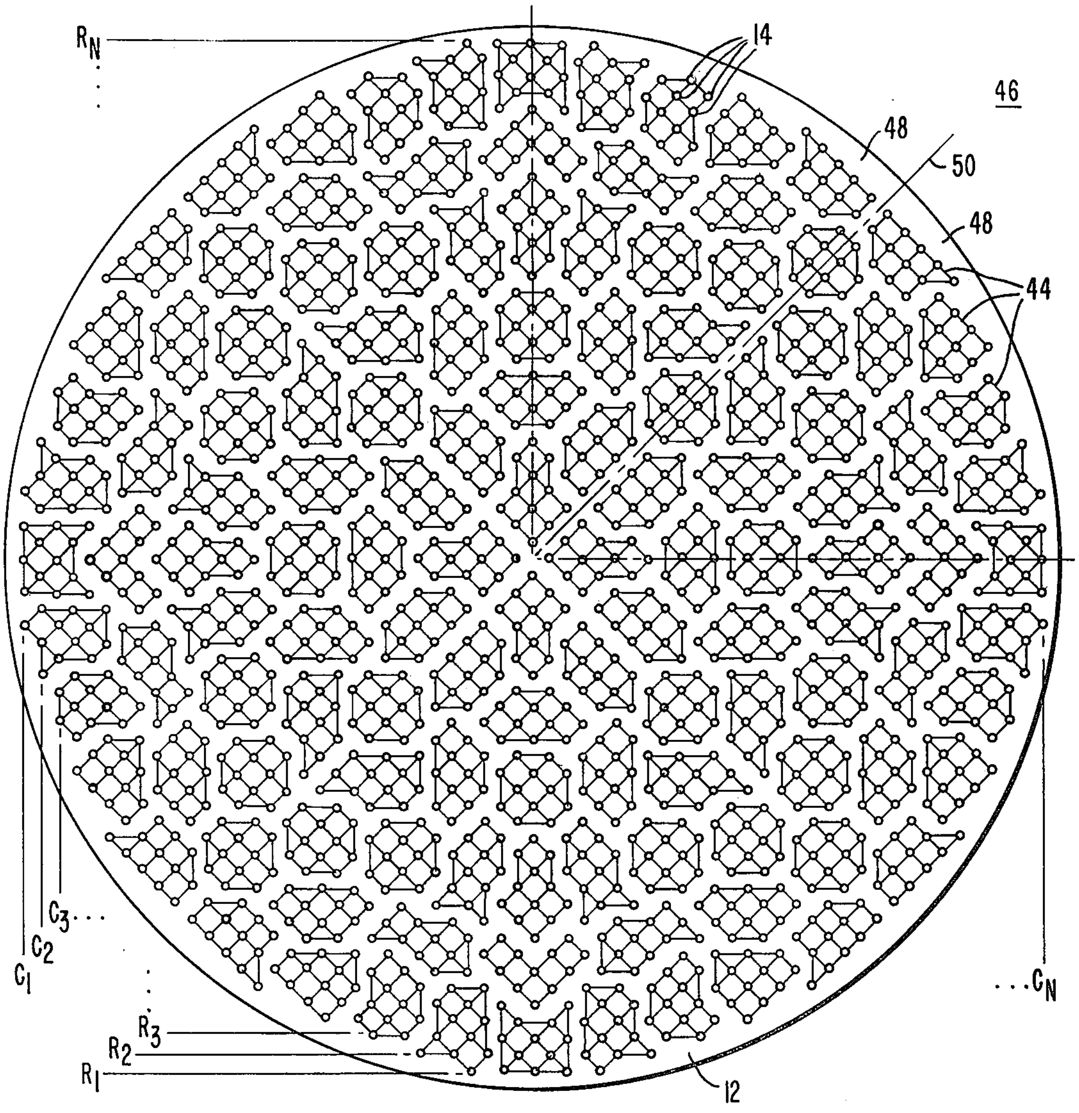
FIG. 2 shows exemplary, irregular configurations of randomly disposed subarrays for the phased array antenna of FIG. 1.

In FIG. 2, taken along the lines II—II of FIG. 1, the points indicate the radiating elements 14 shown in FIG. 1, and the narrow lines connecting the points indicate the agglomeration of radiating elements which are randomly selected to be associated with a particular feed line to form a geometrically irregular subarray 44. Although the selection of the radiating elements is random, and the geometrical patterns defining the various subarrays 44 of FIG. 2 are irregular, the choice of the shape and position of the subarrays 44 is not completely arbitrary.

Several principles are incorporated in the selection of radiating elements 14 which are to be agglomerated into subarrays 44 to improve the antenna pattern of the phased array antenna. First, the radiating elements 14 are chosen so as to avoid regularity in the geometrical pattern of the subarrays 44 and repetition in the disposition of the subarrays 44 on the conducting surface 12. This aspect of the subarrays 44 provides an illumination function which is an irregularly stepped approximation of the desired continuous illumination function. The irregular steps provide the aperiodicity in the illumination error function which results in more even energy distribution in the antenna pattern as will be described further in relation to FIGS. 3 and 4.

The second principle upon which the radiating elements 14 of FIG. 2 are chosen is that an attempt is made to provide subarrays 44 comprised of approximately the same number of radiating elements 14. This procedure will deter the occurrence of excessive deviations from the desired illumination function which cannot be compensated for by a multiple of smaller deviations. If an appropriate number of radiating elements 14 are chosen to comprise the subarray 44, an additional benefit is that standard, readily available components may be used. For example, if a subarray 44 is comprised of twelve radiating elements 14, a standard twelve-to-one power divider may be used for the power dividers 28, 30 and 32 linking the feed lines 22, 24, 26, 38, 40 and 42 with the phase shifters 16 associated with the individual radiating elements 14 in FIG. 1.

The third principle upon which the radiating elements 14 which are agglomerated into the irregular subarrays 44 of FIG. 2 are chosen is that, while the subarrays 44 are to a large extent randomly disposed with respect to each other and with respect to their location on conducting surface 12, some symmetry between random arrangements of subarrays within a particular section of the conducting surface is permissible to simplify the design of the illumination function for the antenna 10. In the example of FIG. 2, conducting plane 12 is circular and each quadrant 46 of the circle is comprised of substantially the same arrangement of irregular subarrays. Further, each quadrant is comprised of two octants 48 whose subarray arrangements are mirror images, joined about their common radial axis 50. Therefore, the design of the illumination function of the antenna 10 requires the determination of the amplitude and phase excitation to be applied to the subarrays for only one octant of the circular antenna. This replication of octant designs does not degrade the quality of the antenna pattern since it lacks the symmetric type of geometric regularity which results in the appearance of grating lobes in the antenna pattern.

Once a subarray pattern is obtained using the above principles, well-known antenna design methods, such as the Taylor or Chebyshev methods, may be used to determine the desired illumination function. The phase and amplitude of this desired illumination function occurring at the center of each subarray 44 can then be applied to that subarray. Standard computational procedures can then be performed to determine the resulting antenna pattern. By comparison of this computed antenna pattern with the desired pattern, the phase and amplitude of the excitation applied to the various subarrays 44 may be further adjusted by trial-and-error to more precisely approximate the desired antenna pattern.

Figure 3:
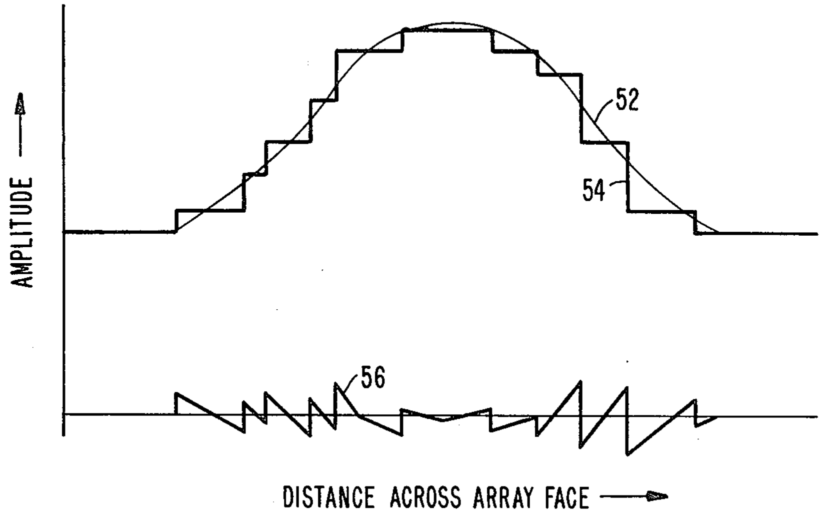
FIG. 3 shows a desirable, continuous, illumination amplitude distribution in contrast with the actual illumination amplitude distribution comprised of irregular steps, and also shows the illumination amplitude error function for the illustrated illumination amplitude distribution.
Figure 4:
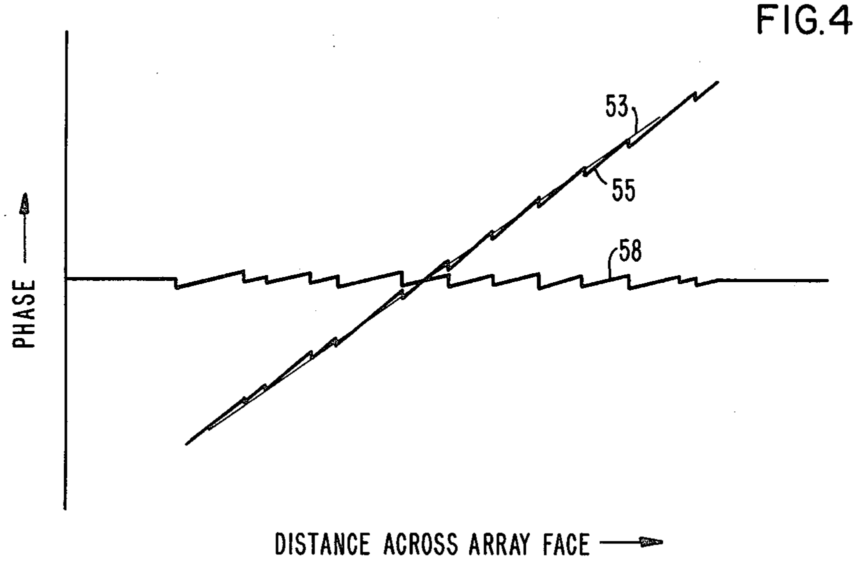
FIG. 4 shows a desirable, continuous, illumination phase distribution in contrast with the actual illumination phase distribution comprised of irregular steps and also shows the illumination phase error function for the illustrated illumination error distribution.

FIGS. 3 and 4 illustrate the desired amplitude and phase illumination functions, represented as lines 52 and 53 respectively, for a particular beam of a beam cluster, which, for example, could be the beam 45 of the beam cluster illustrated in FIG. 1. Also illustrated in FIGS. 3 and 4 respectively are the actual, irregularly stepped, amplitude and phase illumination functions represented as lines 54 and 55 respectively produced by the subarrays 44 of FIG. 1. The abscissa of FIG. 3 represents the ampliude of the antenna illumination function and the ordinate represents the distance across the face of the phased array antenna 10. The abscissa of FIG. 4 represents the phase of the antenna illumination function and the ordinate represents the distance across the face of the phased array antenna 10. From FIGS. 3 and 4, it can be seen that the actual amplitude and phase functions 54 and 55 are identical to the desired amplitude and phase functions 52 and 53 at various points, but, for most of the antenna pattern, various amplitude and phase errors exist.

The illumination error function is comprised of both a phase error function component and an amplitude error function component. However, the phase error function more profoundly affects the illumination error function than does the amplitude error function. The effective phase error function takes into account the fact that phase errors are magnified in relation to the amplitude of the excitation which is applied to the radiating element at which the phase error appears. Therefore, unlike the amplitude error function, the phase error function is sensitive to the amplitude of the excitation signal and tends to be a greater factor in the illumination error function, particularly at the center of the antenna where the amplitude of the illumination function is greatest. Also, the amplitude error function on one half of the antenna opposes the amplitude error function on the opposite half of the antenna, but the phase error function on one half of the antenna is consistent with the phase error function on the other half of the antenna. Therefore, it will appreciated that, due to the greater magnitude and consistent nature of the phase error function, providing aperiodicity in the phase error function is particularly important in limiting the size of grating lobes in the antenna pattern.

The amplitude and phase illumination errors are illustrated in FIGS. 3 and 4 respectively by lines 56 and 58. In the prior art, since the antenna subarrays were comprised of geometrically regular, symmetrical patterns of radiating elements, the illumination error function was a periodic sawtooth waveform. The periodicity in the illumination error functions of phased array antennas of the prior art permitted harmonics in the Fourier transform of the illumination error function that concentrated antenna energy at specific angles from the direction normal to the conducting plane. In contrast with the periodic illumination error functions of the prior art, are the aperiodic illumination error functions of lines 56 and 58 of FIGS. 3 and 4. The aperiodicity is the direct result of the geometrical irregularity and random disposition of the antenna subarrays 44. The Fourier transform of the illumination error function of FIGS. 3 and 4 has no harmonics which concentrate energy at specific angles but, rather, is the Fourier transform of a random function which distributes the antenna energy more evenly than the periodic illumination error functions of the prior art. Therefore, an antenna having the illumination error function of FIGS. 3 and 4 will produce smaller grating lobes than an antenna having the periodic illumination error function of the prior art, thereby providing a phased array radar with an improved antenna pattern due to lower peak sidelobes.

In FIG. 1, the radiating elements 14 are arrayed on the conducting surface 12 in a regular grid arrangement of columns $C_1$ through $C_n$, and rows $R_1$ through $R_n$. Although the columns and rows need not be mutually orthogonal as shown in FIG. 1, antenna arrays which have such columns and rows afford the advantage that the calculation of the appropriate illumination function to achieve the desired antenna pattern is much simpler than for antenna arrays which have no such regular grid arrangement.

Figure 5:
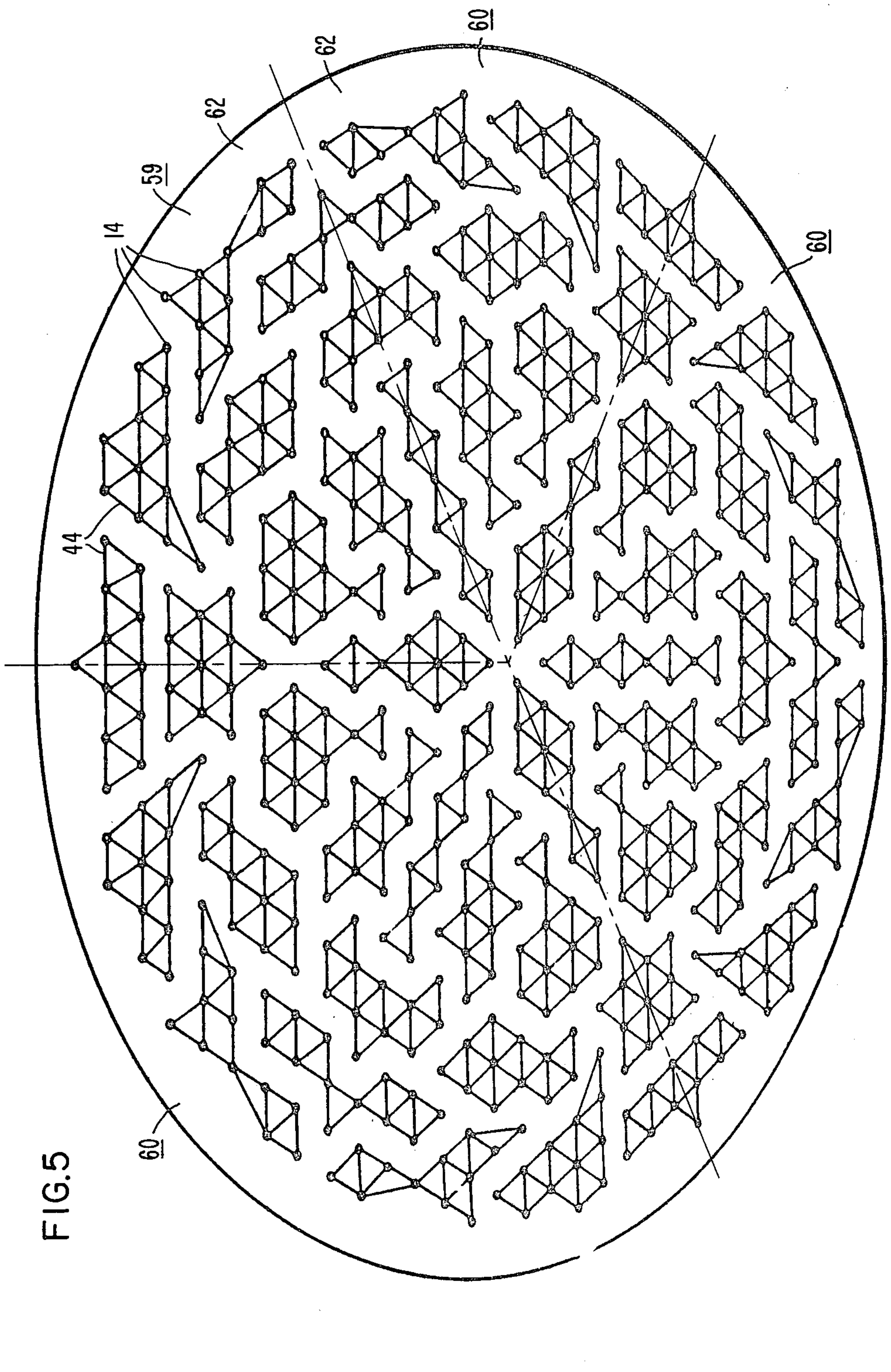
FIG. 5 shows exemplary, irregular configurations of randomly disposed subarrays for an elliptical phased array antenna.

FIG. 5 shows a phased array antenna similar to the antenna of FIG. 2 except that the columns and rows of the radiating elements 14 are such that the radiating elements 14 are triangularly disposed on an elliptical conducting surface 59. Due to the triangular disposition of the antenna elements 14, the sections of the conducting surface 59 within which the symmetry in the arrangement of subarrays 44 occurs are trisections 60. Trisections 60 may be further defined as being comprised of two sextants 62 of the elliptical conducting surface 59. Due to the elliptical nature of conducting surface 59, the trisections 60 are not precise repetitions of a particular subarray arrangement and the sextants 62 combining to form a trisection 60 are not mirror images of each other joined at their common radial axis as was true of the quadrants 46 and the octants 48 of the circular conducting surface 12 of FIGS. 1 and 2. Nevertheless, the trisections 60 and the sextants 62 may be considered to be related. The trisections 60 are dimensional distortions of each other and the sextants 62 are dimensional distortions of each other's mirror image and, therefore, to this extent, admit to the same design efficiency as was discussed for the circular conducting surface 12 of FIGS. 1 and 2.

I claim:

1. A phased arranged antenna responsive to the excitation signals of a radar set, said antenna comprising:
- a conducting surface; and
- a regular array of radiating elements arranged on said conducting surface, the elements of said array having substantially the same amplitude excitation being agglomerated into geometrically irregular subarrays to substantially reduce the grating lobes of the antenna pattern.

2. A phased array antenna that is responsive to the excitation signals of a radar transmitting said antenna comprising:
- a conducting surface; and
- a multiple of radiating elements arranged on the conducting surface in a regular array of rows and columns, the elements of said array having substantially the same amplitude excitation being agglomerated into randomly disposed, geometrically irregular subarrays which substantially reduce the grating lobes of the antenna pattern.

3. A phased array antenna that is responsive to the excitation signals of a radar transmitter, said antenna comprising:
- a conducting surface; and
- a regular array of radiating elements arranged on said conducting surface where the excitation of the radiating elements is controlled in relation to their disposition with respect to other radiating elements of the antenna to provide a controlled antenna illumination function, and where the radiating elements responsive to substantially the same amplitude excitation signal are agglomerated into randomly disposed, geometrically irregular subarrays to provide an aperiodic illumination error function for substantially reducing the grating lobes of the antenna pattern.

4. The apparatus of claim 3 in which said geometrically irregular subarrays include a predetermined number of said radiating elements, and in which said subarrays are disposed in an arrangement which is periodically repeated to complete the phased array antenna.

5. The apparatus of claim 4, in which said subarrays are disposed in a quadrant arrangement which is repeated four times to complete the phased array antenna.

6. The apparatus of claim 5 in which said quadrant arrangement is formed from an octant arrangement and its mirror image, joined at their axis of symmetry.

7. An improved phased array antenna having an array of radiating elements that provide a controlled antenna pattern in response to an excitation signal that is controlled in relation to the disposition of the radiating elements with respect to each other, said improvement comprising:

subarrays of radiating elements that are arranged in a regular array of rows and columns; and that are responsive to a particular amplitude excitation signal, where the subarrays are geometrically irregular and are randomly disposed over said antenna to provide an irregularly stepped illumination function across the antenna that substantially reduces the grating lobes of the antenna pattern.

8. An improved phased array antenna having radiating elements arranged on a conducting surface, the excitation of the radiating elements being controlled in relation to the relative disposition of said radiating elements to provide a controlled illumination function for said phased array antenna, said improvement comprising:

subarrays of radiating elements that are arranged in a regular array of rows and columns and that are responsive to substantially identical amplitude excitation, where the subarrays are geometrically irregular and are randomly disposed within sections of the conducting surface of said phased array antenna to provide an aperiodic illumination error function for said antenna that substantially reduces the grating lobes of the antenna pattern.

9. The apparatus as claimed in claim 8 wherein said phased array antenna has a substantially circular conducting surface, and the sections of said conducting surface in which the subarrays are randomly disposed are comprised of quadrants of said conducting surface.

10. The apparatus as claimed in claim 9 wherein each quadrant of said conducting surface is comprised of two octants of said conducting surface, said octants having substantially mirror imaged arrangements of said subarrays.

11. An improved phased array antenna having a substantially elliptical conducting surface on which a multiple of radiating elements are arranged to provide an antenna pattern of a predetermined contour and direction in response to an excitation signal; said improvement comprising:

subarrays of predetermined number of radiating elements, said radiating elements being arranged in a regular array of rows and columns and being responsive to a particular amplitude excitation, where the subarrays are geometrically irregular and are randomly disposed within trisections of said elliptical conducting surface to provide an aperiodic illumination error function for said antenna that substantially reduces the grating lobes of the antenna pattern.

12. The apparatus of claim 11 in which said subarrays are randomly disposed within sextants of said elliptical conducting surface, where selected ones of said sextants are joined at their common radial axis to form said trisections.

13. An improved phased array antenna having an array of radiating elements arranged on a circular conducting surface, said radiating elements providing an antenna pattern whose shape and direction are controlled by regulating the amplitude and phase excitation of the radiating elements in relation to their disposition within the array, the improvement comprising:

subarrays of radiating elements that are arranged in a regular array of rows and columns and that are responsive to a particular amplitude excitation, where the subarrays are geometrically irregular and are randomly disposed within octants of the circular conducting surface to provide an aperiodic illumination error function for said antenna for substantially reducing the grating lobes of the antenna pattern, said octants being joined at a common radial axis such that the design of said antenna requires the determination of subarray amplitude and phase excitation values for only one octant of said phased array antenna.

14. Apparatus for propagating a pattern of electromagnetic energy in free space in response to energy provided by a radar transmitter, said apparatus comprising:

a conducting surface;

a regular array of radiating elements arranged in rows and columns on said conducting surface; and means for exciting subarrays of said radiating elements in response to said transmitting said subarrays defining geometrically irregular patterns on the conducting surface for providing an aperiodic illumination function for said antenna to limit the amplitude of grating lobes in the electromagnetic energy pattern.

15. Apparatus for propagating a pattern of electromagnetic energy in free space in response to energy provided by a radar transmitter, said apparatus comprising:

a conducting surface;

a regular array of radiating elements arranged in rows and columns on said conducting surface; and means for providing predetermined amplitude excitations to subarrays of said radiating elements, and for providing substantially the same amplitude excitation to radiating elements of said subarrays, said subarrays defining geometrically irregular patterns on said conducting surface to establish an aperiodic illumination function for said apparatus that limits the amplitude of grating lobes in the electromagnetic energy pattern.

16. A method for propagating a pattern of electromagnetic energy in free space in response to energy provided by a radar transmitter, said method comprising:

arranging a regular array of radiating elements on a conducting surface; and exciting subarrays of said radiating elements in response to the energy provided by the transmitter, said subarrays defining geometrically irregular patterns on the conducting surface to provide an aperiodic illumination function for the array of radiating elements to limit the amplitude of grating lobes in the electromagnetic energy pattern.

17. A method for propagating a pattern of electromagnetic energy in free space in response to energy provided by a radar transmitter, said method comprising:

arranging a regular array of radiating elements on a conducting surface; and providing predetermined amplitude excitations to subarrays of said radiating elements, and providing substantially the same amplitude excitations to radiating elements of one of the subarrays in response to said transmitter, said subarrays defining geometrically irregular patterns on the conducting surface to establish an aperiodic illumination function for the array of radiating elements to limit the amplitude of grating lobes in the electromagnetic energy pattern.

* * * * *